I. M. PERRY.
POST-HOLE AND WELL-DIGGERS.
No. 175,745. Patented April 4, 1876.
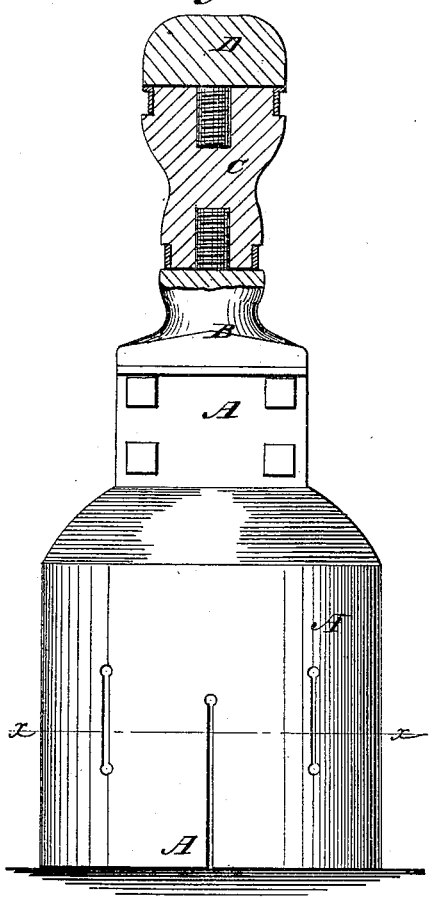
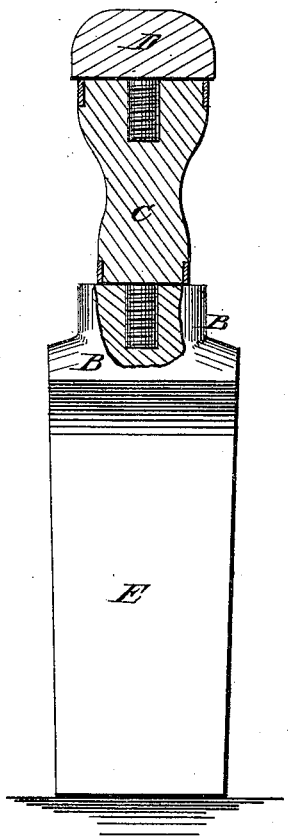
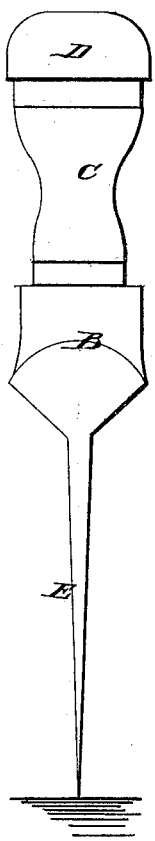
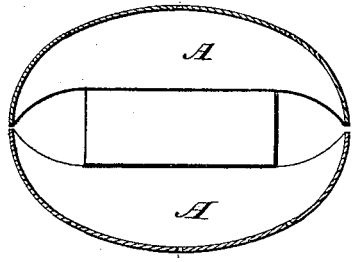
WITNESSES:
Francis McArdle,
John Goethals
INVENTOR:
I. M. Perry
BY
Munn
ATTORNEYS.

UNITED STATES PATENT OFFICE.

ISAAC M. PERRY, OF SLATE CUT, INDIANA.

IMPROVEMENT IN POST-HOLE AND WELL DIGGERS.

Specification forming part of Letters Patent No. 175,745, dated April 4, 1876; application filed February 14, 1876.

*To all whom it may concern:*

Be it known that I, ISAAC M. PERRY, of Slate Cut, Clarke county, Indiana, have invented a new and Improved Post-Hole and Well Digger, of which the following is a specification:

Figure 1 is a side view of the device for raising the soil, the handle being shown in sections. Fig. 2 is a horizontal section of the same, taken through line $x\,x$, Fig. 1. Fig. 3 is a side view of the device for loosening the soil, the handle being shown in sections, and Fig. 4 is an edge view of the same.

Similar letters of reference indicate corresponding parts.

The object of this invention is to furnish improved tools for digging post-holes and wells by hand-power, which shall be simple in construction and convenient in use.

The invention will first be described in connection with drawing, and then pointed out in the claim.

A are two semi-oval blades, the upper ends of which are bent inward and then upward to form shanks, which are bolted to opposite sides of the head B. In the blades A are formed holes, into which the dirt enters and keys itself, so that it can be raised by and with the said blades. The blades or plates A are made of spring-steel, and the head B is made of malleable or cast iron. The handle is formed in sections C and D, which are screwed together, (as seen in Figs. 1 and 3,) so that it may be made of any desired length.

The section C has a detachable cap or head, D, screwed upon it, as shown in Figs. 1, 3, and 4.

In using the device, it is thrust into the ground and then raised, bringing its contents with it, which are jarred or shaken out, and the tool is again thrust into the soil. In case the soil is hard, it should first be loosened with the tool shown in Figs. 3 and 4 before using the dirt-lifter.

The handle of the dirt-loosening tool is made in the same way as hereinbefore described; but the head B is cast upon a straight, slightly-tapering steel plate or blade, E, which is designed to be thrust into the soil in the bottom of the hole to loosen it. The ends of the handle-sections C may be strengthened with bands, if desired.

In digging deep holes a cord and windlass may be used for raising and lowering the tools.

Having thus described my invention, I claim as new and desire to secure by Letters Patent—

The combination, with digger-blades A, of the head B, one or more handle-sections, C, and cap D, substantially as and for the purpose specified.

ISAAC M. PERRY.

Witnesses:
  WILLIAM DAVIS, Sr.,
  JOHN STOCKWELL,
  WILLIAM S. FERRIER.